Jan. 12, 1926.
W. H. DUPRE
1,569,268
FORCE FILLER FOR GREASE CUPS
Filed March 30, 1920
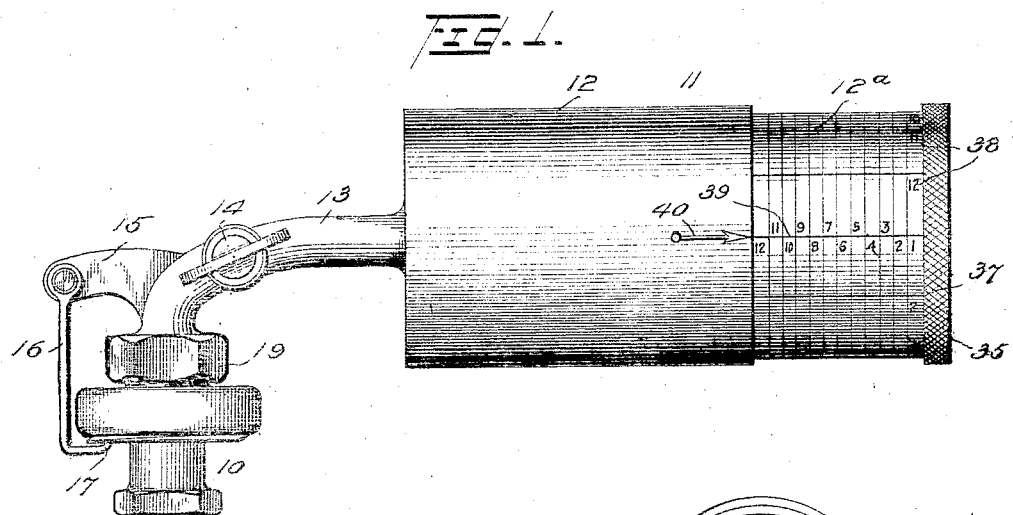
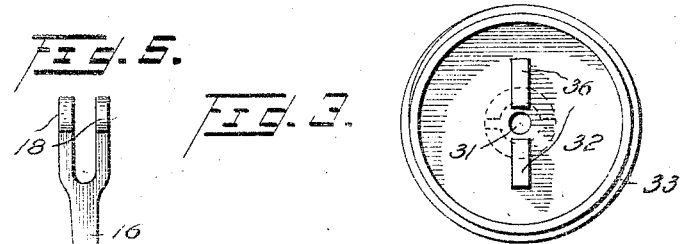
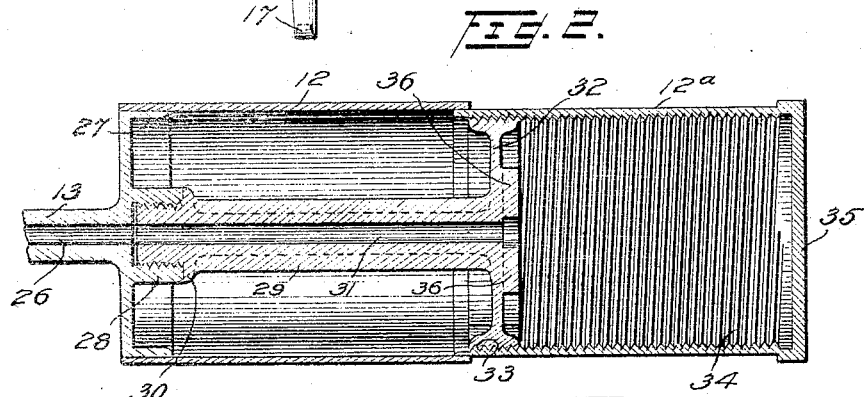
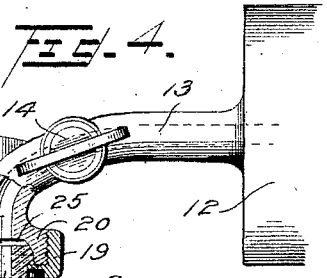
WITNESSES
E. C. Duffy
Philip E. Siggers
INVENTOR
William H. Dupré
BY
E. G. Siggers
ATTORNEY Patented Jan. 12, 1926.

1,569,268

UNITED STATES PATENT OFFICE.

WILLIAM HENRY DUPRÉ, OF VICKSBURG, MISSISSIPPI.

FORCE FILLER FOR GREASE CUPS.

Application filed March 30, 1920. Serial No. 369,939.

*To all whom it may concern:*

Be it known that I, WILLIAM H. DUPRÉ, a citizen of the United States, residing at Vicksburg, in the county of Warren and State of Mississippi, have invented a new and useful Force Filler for Grease Cups, of which the following is a specification.

The present invention relates to grease guns or force fillers especially adapted to fill grease cups with lubricants.

An object of the invention is to provide a novel means for feeding the lubricant to the nozzle or discharge end of a grease gun.

A further object is to provide a force filler having means for forming a tight joint with a grease cup when applied thereto, whereby lubricant will pass from the filler to the cup without any waste thereof.

A specific object of the invention is to provide a force filler or grease gun especially designed to feed grease to that type of grease cup described and claimed in my application filed of even date herewith, Serial No. 369,940. In that application a grease cup is described having a valve in its head, which valve yields when the grease is forced from the grease gun of the present invention into the head of the cup, but when the pressure is relieved returns to its initial position closing the grease cup.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing wherein is shown for illustrative purposes a preferred embodiment of the invention, Fig. 1 is an elevation of a force filler embodying the present invention shown in position to fill one of my improved grease cups.

Fig. 2 is a longitudinal diametric section of the barrel portion of the grease gun.

Fig. 3 is a face view of the disk of the grease gun.

Fig. 4 is a detail with parts in cross section showing the construction of the nozzle of the grease gun.

Fig. 5 is an elevation of the inner face of the hook.

The numeral 10 in the drawing indicates generally the improved grease cup of my copending application and 11 the grease gun of the present invention. This grease gun includes a cylindrical barrel 12 which receives telescopically a complementary plunger barrel 12ª. A nozzle or spout 13 is provided at the end of the barrel 12 remote from that end which receives the plunger 12ª. This spout is curved appropriately so that the outer or discharge end thereof presents the passageway 26 therein transversely of the main body of the grease gun. A cut-off valve 14 is provided in the spout so that the flow of grease through the passageway 26 may be stopped when desired. Formed preferably integrally with the nozzle 13 is an arm 15 extending in a direction substantially longitudinal with respect to the grease gun and pivotally supporting at its outer end a hook 16. Such hook may embrace the arm with bifurcations 18 and convenient means, such as a pin, may provide the pivot of said hook. The free end of the hook is bent approximately at right angles and such bent end is again bent as indicated at 17, the hook so formed being especially adapted to engage with the under side of the head of the improved grease cup as shown in Fig. 1.

The nozzle 13 carries an enlarged head 20 having screw threads on the periphery thereof, whereby the nut 19 may be removably mounted on said head. The nut 19 carries at an intermediate point an inwardly-directed annular web or flange 21 which, when the nut is in place upon the head, fits snugly against the free outer end of the head. This web or flange is spaced from the outer end of the nut 19, thus providing a rim 19ª.

A washer 22 is received within a chamber 25 provided at the outer end of the head 20, such chamber being shaped preferably like a segment of a sphere. The washer has a central passageway 24 in alinement with the passageway 26. An annular shoulder 23 is provided on the washer to engage with the flange 21. This washer extends outwardly from the head 20 as far as does the nut 19 and forms with the rim 19ª an annular space into which lugs provided on the grease cup will fit.

The washer 22 has a wall shaped like a segment of a sphere in order to fit within the chamber 25; but the thickness of the washer within the annular flange 21 is less than the depth of the chamber 25, so that a space ordinarily exists between the washer and the end of the passageway 26. This is clearly shown in Fig. 4. The washer is of any flexible material and is designed to yield inwardly and occupy the upper portion of the chamber 25 when the grease gun is seated firmly upon a grease cup. The purpose of the spherical wall of the chamber and the spherical side of the washer is to permit limited rocking of the washer within its chamber so that variations in the angle of the grease gun with respect to the grease cup will not prevent making a tight joint between the two.

The nozzle 13 is preferably integral with a head or collar 27 which may be secured in any desirable way to or even be integral with the barrel 12. This head 27 has a concentric boss 28 internally screw threaded, as shown. A stem 29 having a passageway 31 longitudinally thereof is screwed into the boss 28 and has an annular shoulder 30 fitting on the outer end of the boss. Such a stem provides a grease conduit. This stem 29 carries a disk 32 upon the other end beyond the open end of the barrel 12, which disk cooperates with the plunger barrel 12ª when the latter is turned to force grease through the alined passageways 31 and 26.

The disk 32 has a rim 33 which is screw threaded peripherally to engage with internal screw threads 34 of the plunger 12ª. The disk carries on its outer face integral lugs or projections 36, seen best in Fig. 3, which are spaced from each other and surround the end of the passageway 31. The function of these lugs 36 is to provide means by which a wrench may tighten or loosen the stem 29 with respect to the boss 28 which holds it within the grease gun.

The outer end of the plunger barrel 12ª is closed by a wall 35 and preferably a raised and milled edge 37 (see Fig. 1) or the equivalent is provided to make easy the turning of the plunger barrel 12ª upon the stationary disk 32. The threads provided on the disk 32 and on the stem 29 are so arranged that the turning of the plunger inwardly against the resistance of the grease only tends to tighten the hold of the stem 29.

The plunger barrel 12ª, besides acting to force the lubricant out of the grease gun, provides a convenient means by which the amount of grease fed, as well as the amount of grease contained in the instrument, may be ascertained. A peripheral scale 38 is marked upon the barrel 12ª, such scale enabling the operator to turn the plunger any fraction of a revolution that may be desired. A longitudinal scale 39 is also provided on the plunger, the scale 39 being such that for each complete revolution of the plunger barrel one graduation or mark is covered as the plunger telescopes into the barrel. An arrow head 40 or similar device may be marked on the outer face of the barrel 12 so that portions of a revolution of the plunger may be read with accuracy upon the scale 38.

It will be clear that if one desires to force a certain quantity of grease out through the nozzle end, it will only be necessary to bring the grease up to the nozzle, take a reading with the aid of the two scales, and then turn the plunger barrel until the desired quantity of grease has been forced out. The scales may read in cubic centimeters or in any other convenient volumetric unit. If one should desire to measure accurately the amount of grease contained in the grease gun, the valve 14 will be closed, thus preventing grease from moving out of the gun, and the plunger will be screwed into the barrel until it meets with that resistance which experience teaches indicates compression of the grease; then a reading will be taken by the aid of the two scales, which will give the exact quantity of grease in the barrel and nozzle up to the valve.

When the instrument is applied to a grease cup such as the one of the co-pending application referred to, the hook 17 is engaged under the head of the grease cup and the barrel is grasped by the hand to form a lever with the hook end 17 acting as the fulcrum. The pressure placed upon the barrel will be applied by the outer face of the washer 22 upon the top of the grease cup. Obviously, the distance between the pivot point at 17 and the point of pressure at 22 is so much less than the length of the lever (for in this case the grease gun acts as a lever), that a relatively small pressure upon the barrel is sufficient to effect a very tight joint between the nozzle and the grease cup. This great pressure which may be placed upon the washer will cause the same to move inwardly somewhat, the chamber 25 permitting such movement. When the grease gun is so seated upon the grease cup, it will be impossible for any grease to escape from the nozzle without passing into the grease cup. Thus none of the lubricant is wasted and the filling operation is a clean one. When the grease is exhausted from the gun, the plunger 12ª is readily unscrewed from the disk 32 and re-filled, whereupon the instrument is ready for further work as soon as the plunger is mounted in position again. The cut-off valve prevents possible ejection of the lubricant when the force filler is not in rest. In hot weather, grease guns will frequently drip grease from the nozzle end;

but in the present device this waste of the lubricant is prevented.

The construction specifically shown in Figure 2 of the drawings embodying a cup-shaped barrel, a grease conduit supported in the barrel, a disc secured to one end of the conduit, the other end communicating with the nozzle of the device, a cylindrical plunger slidably fitting into the barrel and screw-threaded on its interior, said plunger engaging with threads on the periphery of the disc and having a closed outer end, is specifically claimed in my companion application, filed October 10th, 1921, Serial No. 506,864.

What is claimed is:

1. In a force filler for grease cups, a nozzle, and means for feeding lubricant to the nozzle, said nozzle having means for seating itself upon a grease cup to be filled, said nozzle and said feeding means being movable as a unit, and other means on the nozzle for engaging with the grease cup independently of and below the said seating means, the said means for seating the said other means being arranged at opposite sides of the extremity of the nozzle, whereby downward pressure upon the feeding means acting through the said other means will effect a tight joint between the nozzle and the grease cup.

2. In a force filler for grease cups, a nozzle, and means for feeding lubricant to the nozzle, said means being in substantially rigid relation with the nozzle, said nozzle having means whereby it may be seated upon the grease cup, and additional means for engaging with the latter, said additional means extending beyond the end of the nozzle, whereby the force filler may be used as a lever acting through the point of engagement of said additional means with the grease cup to effect a tight joint between the nozzle and the grease cup.

3. In a force filler for grease cups, a nozzle, and means for feeding lubricant to the nozzle, said means being in substantially rigid relation with the nozzle, said nozzle having means whereby it may be seated upon a grease cup, and a hook for engagement with the latter when seated thereon, said hook being located beyond the end of the nozzle and pivoted thereon, whereby the force filler may be used as a lever acting through the point of engagement of the hook with the grease cup to effect a tight joint between the nozzle and the grease cup.

4. In a force filler for grease cups, a grease gun including a barrel and a nozzle in substantially rigid relation therewith, said nozzle having seating means at its outer end whereby it may be seated upon a grease cup to be filled, and a hook connected to the nozzle at the side opposite to the barrel, said hook engaging with the grease cup beneath the said seating means to hold the grease cup in seating engagement with the nozzle, whereby downward pressure upon the barrel acting through said hook will effect a tight joint between the nozzle and the grease cup.

5. In a force filler for grease cups, a nozzle, and means for feeding lubricant to the nozzle, said nozzle having seating means for seating itself upon a grease cup to be filled, said means comprising a yieldable element movably held at the outer end of the nozzle to permit limited movement inwardly when the nozzle is seated, said nozzle and feeding means being movable as a unit, and other means on the nozzle for engaging with the grease cup independently of and below the said seating means and at that side of the grease cup remote from the feeding means, whereby pressure upon the feeding means acting through the said other means will effect a tight joint between the nozzle and the grease cup.

6. In a force filler for grease cups, a nozzle, and means for forcing lubricant out of the nozzle, said means being in substantially rigid relation with the nozzle, said nozzle having an enlarged head at its outer end and a nut removably mounted on said head, said head having a chamber communicating with the passage of the nozzle, means held in the chamber for effecting a tight joint with the grease cup when the filler nozzle is seated thereon, means formed integrally with the nut for holding the tight joint making means from outward movement with respect to the nozzle, and means on the nozzle for engaging with the grease cup to hold it seated, whereby pressure upon the forcing means will effect a tight joint between the nozzle and the grease cup.

7. In a force filler for grease cups, a nozzle, and means for forcing lubricant out of the nozzle, said means being in substantially rigid relation with the nozzle, said nozzle having an enlarged head, a chamber provided in said head in communication with the passageway of the nozzle, said chamber being of relatively large diameter with respect to the diameter of the passageway, a washer received within the chamber and movable therein, said washer having a passageway alining with the passageway of the nozzle, said nozzle including removable means mounted on the head for holding the washer in place, and means on the nozzle for engaging with the grease cup to hold it seated on the nozzle, whereby pressure upon the forcing means will effect a tight joint between the nozzle and the grease cup.

8. In a force filler for grease cups, a nozzle, and means for forcing lubricant out of the nozzle, said means being in substantially rigid relation with the nozzle, said nozzle having an enlarged head and a nut removably mounted on said head, said nut having an annular inturned web, a washer of flexible material held within the head by said web, said head having a chamber with rounded walls for permitting limited rocking of said washer within the same, and means on the nozzle engaging with the bottom of the grease cup to hold it seated in connection with the nozzle, whereby downward pressure upon the forcing means will effect a tight joint between the nozzle and the grease cup.

9. In a force filler for grease cups, a nozzle, and means for feeding lubricant to the nozzle, said means being in substantially rigid relation with the nozzle, a cut-off valve in the nozzle, an arm integral with the nozzle, a hook pivotally mounted on the outer end of the arm, said hook being shaped to engage with the head of a grease cup, the free end of the nozzle being shaped to be seated upon the upper end of the grease cup to effect a tight joint therewith, whereby the force filler may be used as a lever acting through the point of engagement of the hook with the grease cup to insure a tight joint between the nozzle and the grease cup.

10. The combination with a nozzle having an enlarged head and a chamber provided in said head and partially spherical, of a washer seated within the chamber and also partially spherical, the thickness of the washer being less than the depth of the chamber so as to leave a space between the washer and the upper wall of the chamber, said washer having a passageway in alinement with the passageway of the nozzle, removable means mounted on the head for holding the washer in place, and means for feeding lubricant to the nozzle, said means being in substantially rigid relation with the nozzle, and other means for engagement with the grease cup whereby a tight joint is effected between the nozzle and the grease cup when the force filler is pressed toward the nozzle.

11. In combination with a nozzle having an enlarged head, a chamber provided in said head and partially spherical, a flexible washer seated within the chamber and also partially spherical, the thickness of the washer being less than the depth of the chamber so as to leave a space between the washer and the upper wall of the chamber, said washer having a passageway in alinement with the passageway of the nozzle.

In testimony that I claim the foregoing as my own, I have hereto affixed my signature.

WILLIAM HENRY DUPRÉ.